United States Patent
Ryan et al.

(10) Patent No.: US 10,800,298 B2
(45) Date of Patent: Oct. 13, 2020

(54) SEAT SUSPENSION SYSTEM WITH HORIZONTAL MOVEMENT AND DAMPENING

(71) Applicant: DEERE & COMPANY, Moline, IL (US)

(72) Inventors: Alex M. Ryan, Cedar Falls, IA (US); Charles N. Warren, Cedar Falls, IA (US); Gregory O. McConoughey, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 74 days.

(21) Appl. No.: 16/114,897

(22) Filed: Aug. 28, 2018

(65) Prior Publication Data

US 2020/0070693 A1 Mar. 5, 2020

(51) Int. Cl.
*B60N 2/50* (2006.01)

(52) U.S. Cl.
CPC ............. *B60N 2/501* (2013.01); *B60N 2/502* (2013.01); *B60N 2/508* (2013.01)

(58) Field of Classification Search
USPC ..... 248/419, 420, 423, 424, 429; 296/65.01, 296/66, 65.11, 65.12, 65.18; 297/311, 297/312, 314
See application file for complete search history.

(56) References Cited

U.S. PATENT DOCUMENTS

| | | | | |
|---|---|---|---|---|
| 3,705,705 A | * | 12/1972 | Eggert, Jr. ........... | B60N 2/4221 248/430 |
| 3,792,896 A | * | 2/1974 | Eggert, Jr. ............. | B60N 2/504 297/216.2 |
| 4,351,556 A | * | 9/1982 | Worringer .............. | B60N 2/502 248/424 |

(Continued)

FOREIGN PATENT DOCUMENTS

| | | |
|---|---|---|
| DE | 102012112525 B4 | 12/2017 |
| WO | 9530558 A1 | 11/1995 |
| WO | 2007094707 A1 | 8/2007 |

OTHER PUBLICATIONS

German Search Report issued in counterpart application No. 102019211437.7 dated Mar. 12, 2020 (10 pages).

*Primary Examiner* — Alfred J Wujciak
(74) *Attorney, Agent, or Firm* — Taft Stettinius & Hollister LLP; Stephen F. Rost

(57) ABSTRACT

A seat suspension system that includes a seat base that enables movement of the seat horizontally; and a lateral attenuation system that when activated, dampens movement of the seat horizontally. The seat base can move along first and second horizontal axes that are orthogonal. The seat base can include a carrier casting moveable along the first horizontal axis relative to a reservoir casting, and a seat casting moveable along the second horizontal axis relative to the carrier casting. The castings can move on rails. The lateral attenuation system can include an actuation mechanism, a stopper, and a connector that couples the actuation (Continued)

mechanism and stopper to the seat base. When the actuation mechanism is activated, the stopper can connect the reservoir and seat castings. The lateral attenuation system can be configured to stop movement of the seat along the first and second horizontal axes at any desired position.

18 Claims, 6 Drawing Sheets

(56) References Cited

U.S. PATENT DOCUMENTS

| | | | |
|---|---|---|---|
| 4,477,050 A | 10/1984 | Thompson et al. | |
| 4,626,018 A * | 12/1986 | Massey | B60N 2/502 248/602 |
| 6,719,258 B2 * | 4/2004 | Bryngelson | B60N 2/502 248/419 |
| 2004/0051023 A1 | 3/2004 | Bryngelson et al. | |
| 2009/0184448 A1 * | 7/2009 | Hiser | B60N 2/38 267/140.11 |

* cited by examiner

SEAT SUSPENSION SYSTEM WITH HORIZONTAL MOVEMENT AND DAMPENING

FIELD OF THE DISCLOSURE

The present disclosure relates to seats in a vehicle, and more particularly to horizontal movement and attenuation of horizontal movement of seats in a vehicle.

BACKGROUND

Vehicle seats are often equipped with springs or other mechanisms that allow vertical movement of the seat relative to the vehicle floor for greater comfort of the vehicle operator or passenger. Vehicle seats can also be equipped with mechanisms that enable horizontal movement of the seat relative to the vehicle floor to provide greater comfort or ease to the vehicle operator. However, in some situations a vehicle operator may wish to dampen or eliminate the horizontal movement of the seat relative to the vehicle floor. For example, the vehicle operator may wish to attenuate or eliminate horizontal movement of the seat when traveling on the side of a hill, when traveling back and forth across a gully, or in some other operator selected situation.

It would be desirable to have a lateral attenuation system that enables an operator to dampen or eliminate horizontal movement of the seat relative to the vehicle floor. It would also be desirable to be able to stop horizontal movement of the seat relative to the vehicle floor at any desired position in the seat's movement range.

SUMMARY

A seat suspension system for a seat on a vehicle is disclosed. The seat suspension system includes a seat base assembly configured to enable movement of the seat horizontally; and a lateral attenuation system. When activated, the lateral attenuation system is configured to dampen movement of the seat horizontally. When inactivated, the lateral attenuation system is configured to not dampen movement of the seat horizontally. The seat base assembly can be configured to enable movement of the seat back and forth along a first horizontal axis, and to enable movement of the seat back and forth along a second horizontal axis, where the first horizontal axis is orthogonal to the second horizontal axis; and when activated the lateral attenuation system can be configured to dampen movement of the seat back and forth along both the first and second horizontal axes. The seat suspension system can also include a vertical spring system configured to enable movement of the seat in a vertical direction, where the vertical direction is orthogonal to both the first and second horizontal axes; where the lateral attenuation system does not dampen movement of the seat in the vertical direction.

The seat base assembly can include a reservoir casting, a carrier casting and a seat top base plate. The carrier casting can be coupled to the reservoir casting to enable movement of the carrier casting relative to the reservoir casting along the first horizontal axis. The seat top base plate can be coupled to the carrier casting to enable movement of the seat top base plate relative to the carrier casting along the second horizontal axis.

The reservoir casting can include reservoir casting rails, and the carrier casting can include carrier casting connectors. Each of the carrier casting connectors can be coupled to and associated with an associated reservoir casting rail, and each of the carrier casting connectors can be configured to move back and forth along its associated reservoir casting rail in parallel to the first horizontal axis. The reservoir casting can also include a first carrier casting bumper attached to a first reservoir casting rail, and a second carrier casting bumper attached to a second reservoir casting rail, where the first and second carrier casting bumpers dampen movement of the carrier casting connectors back and forth along their associated reservoir casting rails. The first reservoir casting bumper can dampen movement of the carrier casting connectors back and forth along their associated reservoir casting rails in a first direction, and the second reservoir casting bumper can dampen movement of the carrier casting connectors back and forth along their associated reservoir casting rails in a second direction, where the first and second directions are parallel to the first horizontal axis but are opposite to each other.

The carrier casting can include carrier casting rails, and the seat top base plate can include base plate connectors. Each of the base plate connectors can be coupled to and associated with an associated carrier casting rail, and each of the base plate connectors can be configured to move back and forth along its associated carrier casting rail in parallel to the second horizontal axis. The carrier casting can include a first base plate bumper attached to a first carrier casting rail, and a second base plate bumper attached to a second carrier casting rail, where the first and second base plate bumpers dampen movement of the base plate connectors back and forth along their associated carrier casting rails. The first base plate bumper can dampen movement of the base plate connectors back and forth along their associated carrier casting rails in a third direction, and the second base plate bumper can dampen movement of the base plate connectors back and forth along their associated carrier casting rails in a fourth direction, where the third and fourth directions are parallel to the second horizontal axis but opposite to each other.

The seat base assembly can also include an end stop bumper that limits movement of the carrier casting relative to the reservoir casting within a first movement range along the first horizontal axis, and limits movement of the seat top base plate relative to the carrier casting within a second movement range along the second horizontal axis. The lateral attenuation system can be configured to stop movement of the seat back and forth along both the first and second horizontal axes at any desired position within the first and second ranges.

The lateral attenuation system can include an actuation mechanism, a stopper, and an attenuation connector that couples the actuation mechanism and the stopper to the seat base assembly. The actuation mechanism can be configured to move between an activated position where the lateral attenuation system dampens movement of the seat back and forth along both the first and second horizontal axes, and an inactivated position where the lateral attenuation system does not dampen movement of the seat back and forth along either of the first or second horizontal axes. When the actuation mechanism is in the activated position, the stopper can connect the reservoir casting with the seat top base plate. The reservoir casting can include a roughened area, and when the actuation mechanism is in the activated position, the stopper can contact the roughened area of the reservoir casting. The seat top base plate can include a base plate side wall, where the actuation mechanism is on one side of the base plate side wall, the stopper is on the opposite side of the base plate side wall, and the attenuation connector passes through the base plate side wall to couple the actuation mechanism and the stopper. The lateral attenuation system can also include an end plate coupled to the stopper by the attenuation connector such that the stopper is positioned on the attenuation connector between the base plate side wall and the end plate, such that when the actuation mechanism is in the activated position, the end plate is pulled towards the base plate side wall to compress the stopper and force the stopper to bulge and connect the reservoir casting with the seat top base plate. The seat top base plate can also include first and second stopper side walls that are generally perpendicular to the base plate side wall, and are on opposite sides of the stopper, such that when the actuation mechanism is in the activated position, the end plate is pulled towards the base plate side wall to compress the stopper between the end plate, the base plate side wall and first and second stopper side walls to force the stopper to bulge and connect the reservoir casting with the seat top base plate.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
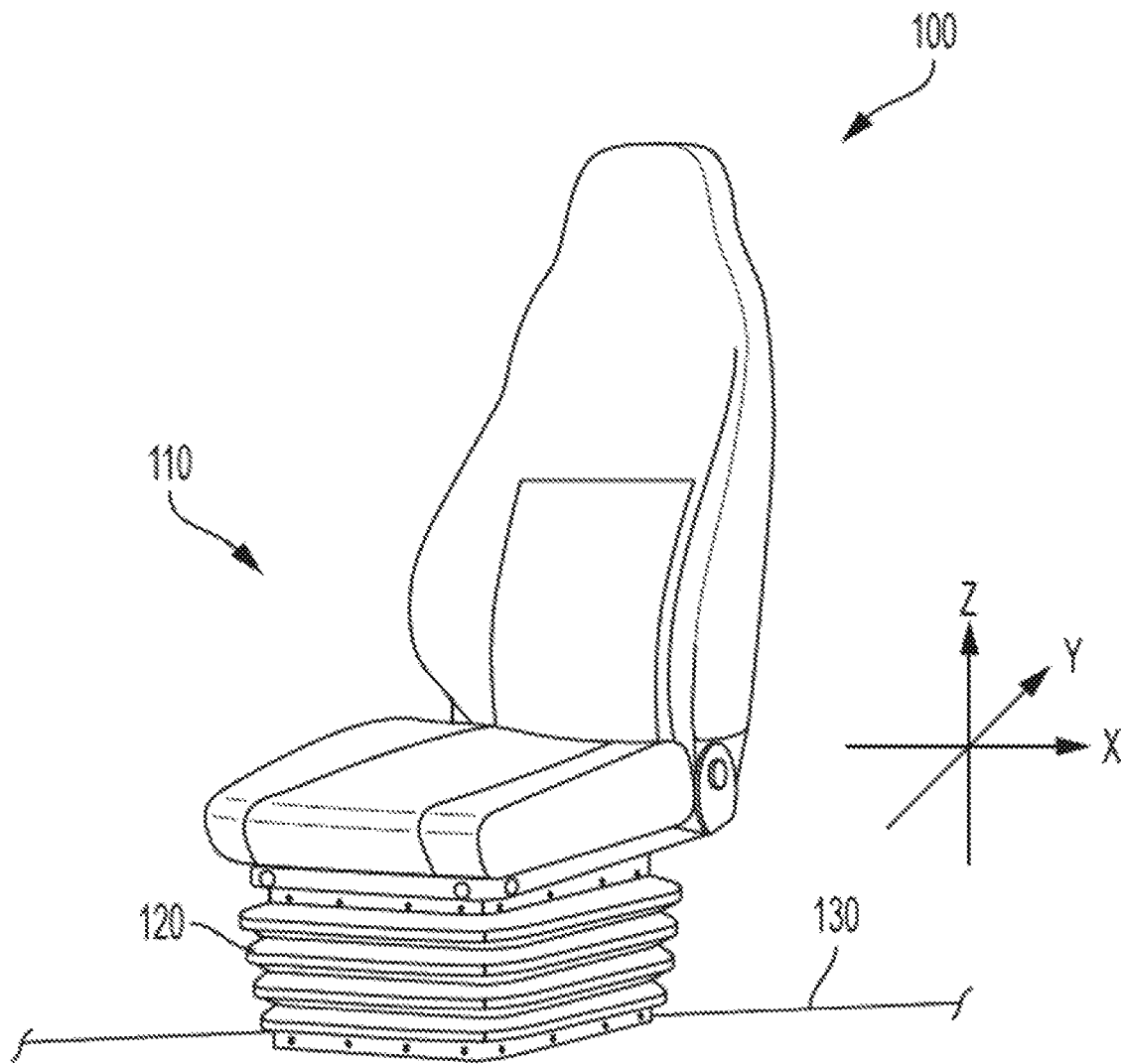
FIG. 1 illustrates an exemplary vehicle seat system which includes a seat top, a seat suspension system and a vehicle or cabin floor.

FIG. 1 illustrates an exemplary vehicle seat system 100 which includes a seat top 110, a seat suspension system 120 and a vehicle or cabin floor 130. The seat suspension system 120 in FIG. 1 is hidden under a bellows enclosure. An operator sits in the seat top 110 and the seat suspension system 120 enables the seat top 110 to move in one or more of the x, y and z directions relative to the vehicle floor 130. Movement that is primarily in the z-direction will be referred to as vertical movement, and movement that is primarily in the x-y plane will be referred to as horizontal movement.

Figure 2:
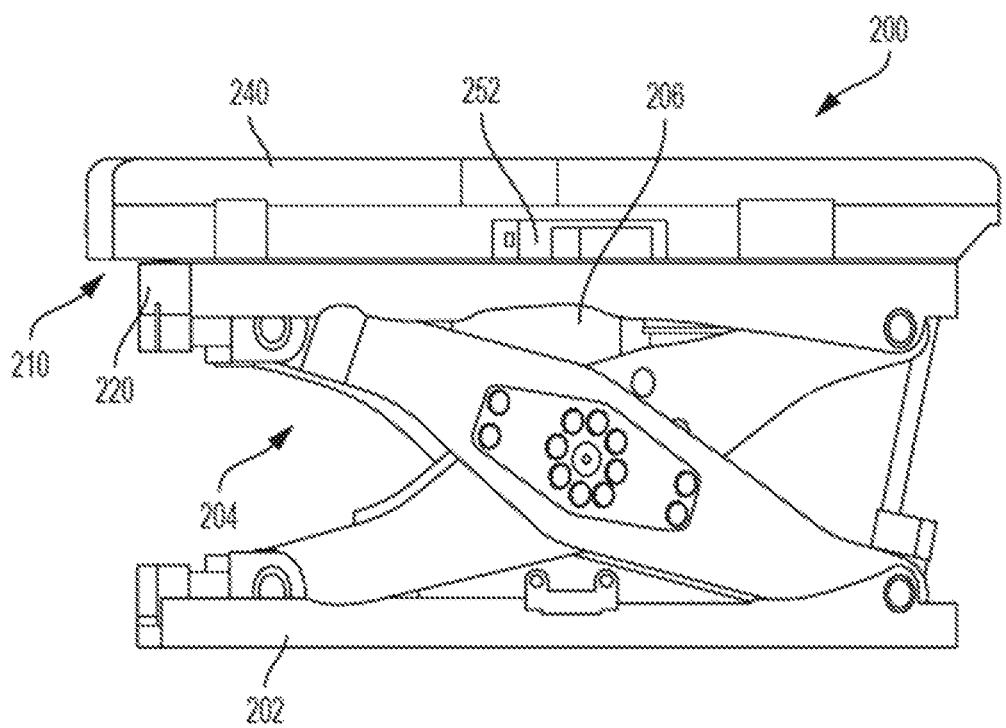
FIG. 2 illustrates a side view of an exemplary seat suspension system with the bellows enclosure removed.

FIG. 2 illustrates a side view of an exemplary seat suspension system 200 with the bellows enclosure shown in FIG. 1 removed. The seat suspension system 200 includes a floor plate 202, a vertical spring system 204, a seat base assembly 210, and an actuation mechanism 252 which is part of a lateral attenuation system. The floor plate 202 is fixedly connected to the floor 130 of the vehicle cabin, and the seat base assembly 210 is attached to the base of the seat top 110. The vertical spring system 204 enables the seat base assembly 210 to move vertically (in the z-direction) relative to the floor plate 202. The vertical spring system 204 is shown in this exemplary embodiment as a scissor linkage, but other spring or vertical movement systems known in the art can be used to enable the seat base assembly 210 and seat top 110 to move in the z-direction relative to the floor plate 202. The seat suspension system 200 can be an active seat suspension system that includes a motor 206 that can help dampen movement in the z-direction. The seat base assembly 210 enables the seat top 110 to move horizontally in or more directions relative to the floor plate 202. The actuation mechanism 252 can be used by an operator to activate a lateral attenuation system (described below) to help dampen or eliminate horizontal movement of the seat base assembly 210.

Figure 3:
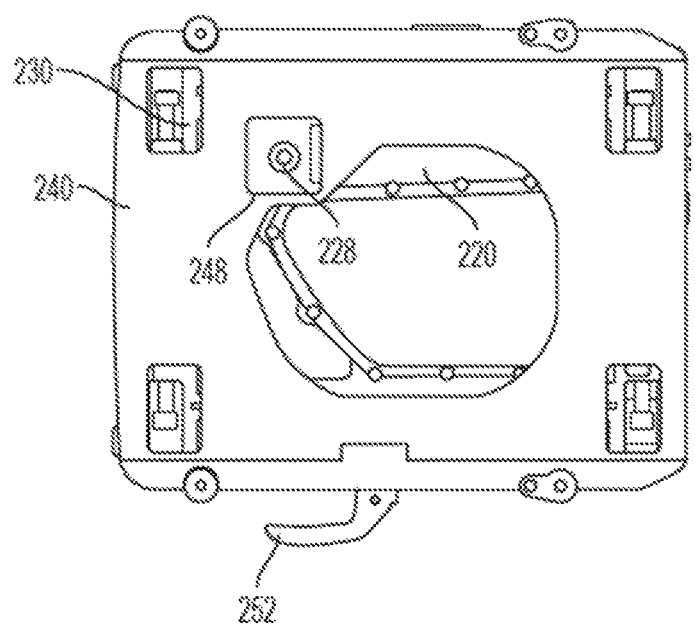
FIG. 3 illustrates a top-down view of an exemplary seat base assembly.
Figure 4:
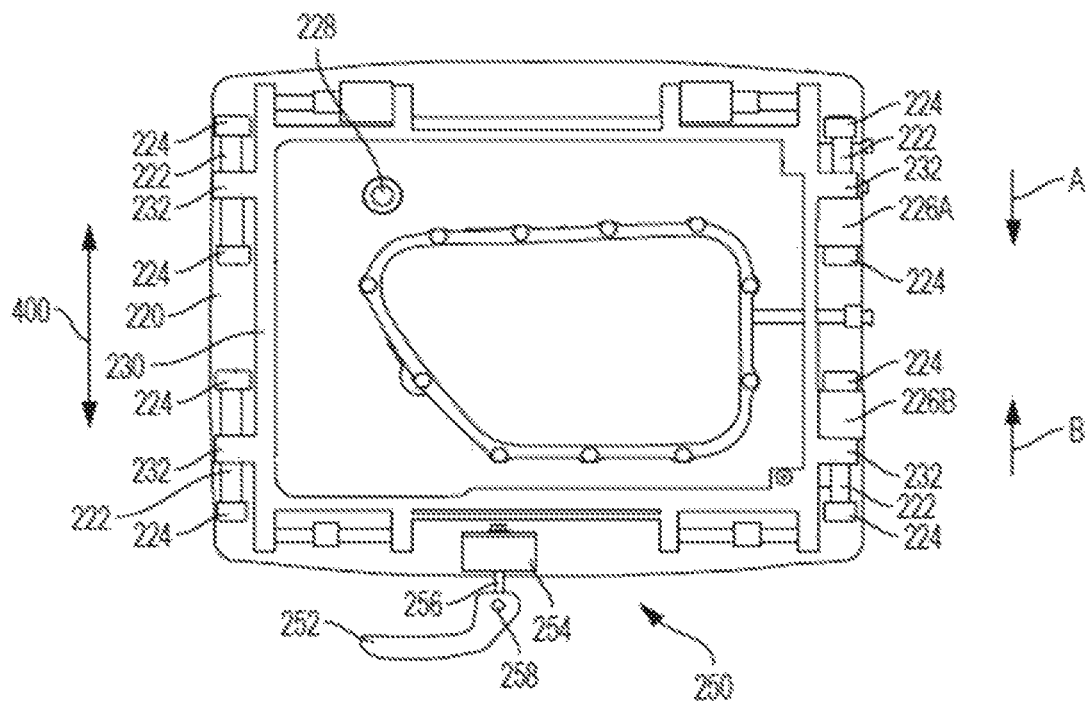
FIG. 4 illustrates a top-down view of the exemplary seat base assembly with the seat top base plate removed to more clearly show the coupling of the reservoir casting with the carrier casting.
Figure 5:
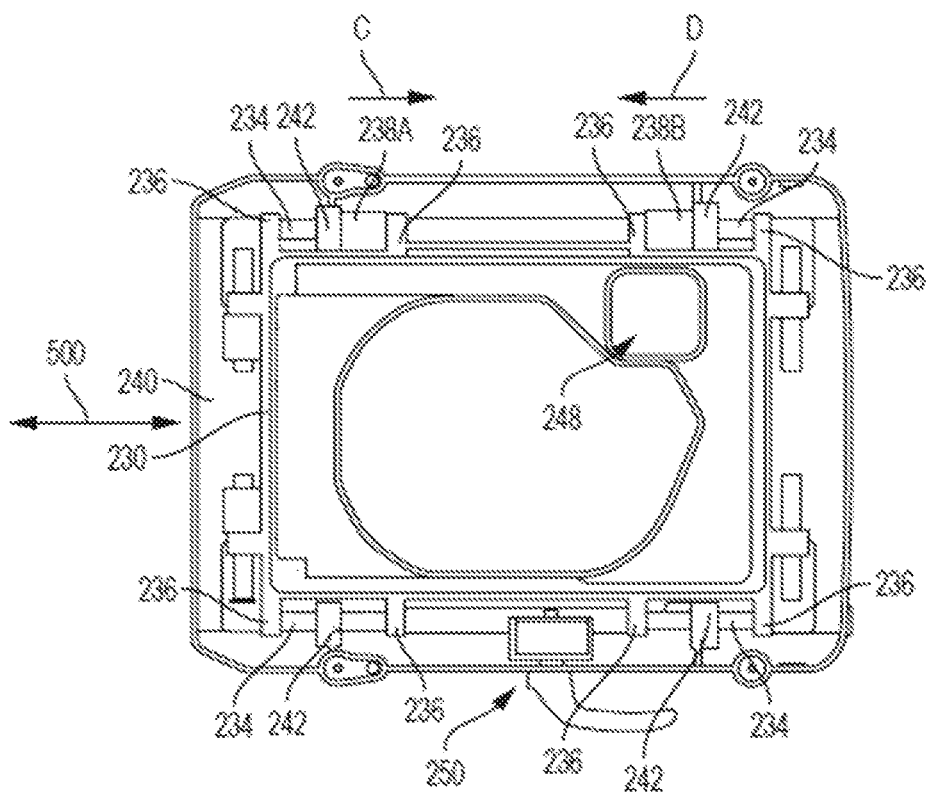
FIG. 5 illustrates a bottom-up view of the exemplary seat base assembly with the reservoir casting removed to more clearly show the coupling of the seat top base plate with the carrier casting.

FIGS. 2-5 show an exemplary embodiment of the seat base assembly 210 that includes a reservoir casting 220, a carrier casting 230, a seat top base plate 240 and a lateral attenuation system 250. FIG. 3 illustrates a top-down view of the seat base assembly 210. FIG. 4 illustrates a top-down view of the seat base assembly 210 with the seat top base plate 240 removed to more clearly show the coupling of the reservoir casting 220 with the carrier casting 230. FIG. 5 illustrates a bottom-up view of the seat base assembly 210 with the reservoir casting 220 removed to more clearly show the coupling of the seat top base plate 240 with the carrier casting 230.

The reservoir casting 220 is attached to the top of the vertical spring system 204 and moves vertically with the vertical spring system 204. The reservoir casting 220 can be horizontally fixed relative to the vertical spring system 204. The carrier casting 230 is coupled to the reservoir casting 220 to allow movement of the carrier casting 230 in a first horizontal direction indicated by a first axis 400 shown in FIG. 4. The first axis 400 is generally orthogonal to the vertical movement of the spring system 204, for example in the left-right or x-direction. The seat top base plate 240 is coupled to the carrier casting 230 to allow movement of the seat top base plate 240 in a second horizontal direction indicated by a second axis 500 shown in FIG. 5. The second axis 500 is generally orthogonal to the vertical movement of the spring system 204 and generally orthogonal to the first axis 400, for example in the fore-aft or y-direction. The x, y and z directions, can represent the first horizontal direction, the second horizontal direction and the vertical direction, respectively. The first and second horizontal axes 400, 500 do not have to be fore-aft and right-left but can be any pair of generally perpendicular horizontal axes.

The carrier casting 230 can be coupled to the reservoir casting 220, as most clearly shown in FIG. 4, at a plurality of horizontal reservoir casting rails 222. Each of the reservoir casting rails 222 can be fixedly attached to the reservoir casting 220 between a pair of reservoir casting rail end posts 224. The carrier casting 230 can include a plurality of carrier aperture connectors 232 that are fixedly attached to the carrier casting 230, one carrier aperture connector 232 associated with each reservoir casting rail 222. Each carrier aperture connector 232 can have an aperture that the associated reservoir casting rail 222 extends through such that the carrier aperture connector 232 can slide along the associated reservoir casting rail 222 between its reservoir casting rail end posts 224. This enables the carrier casting 230 to move in the first horizontal direction (parallel to the first axis 400) relative to the reservoir casting 220. One or more carrier casting bumpers 226A, 226B can be attached to one or more of the reservoir casting rails 222 to dampen horizontal movement of the carrier aperture connectors 232 along the associated reservoir casting rails 222, and thus dampen horizontal movement of the carrier casting 230 in the first horizontal direction relative to the reservoir casting 220.

Carrier casting bumpers 226A, 226B can be attached to two reservoir casting rails 222 to act as counteracting springs to dampen horizontal movement of the carrier aperture connectors 232 as shown in FIG. 4. The first carrier casting bumper 226A resists movement of the carrier casting 230 in the direction of arrow A, and the second carrier casting bumper 226B resists movement of the carrier casting 230 in the direction of arrow B, where arrows A and B are parallel to the first axis 400 but in opposite directions to each other. Thus, in this embodiment the carrier casting bumpers 226A, 226B act as counteracting springs to dampen horizontal movement of the carrier casting 230 in the first horizontal direction relative to the reservoir casting 220.

The seat top base plate 240 can be coupled to the carrier casting 230, as most clearly shown in FIG. 5, at a plurality of horizontal carrier casting rails 234. The direction of the plurality of horizontal carrier casting rails 234 can be generally perpendicular to the direction of the plurality of horizontal reservoir casting rails 222. Each of the carrier casting rails 234 can be fixedly attached to the carrier casting 230 between a pair of carrier casting rail end posts 236. The seat top base plate 240 can include a plurality of base plate aperture connectors 242 that are fixedly attached to the seat top base plate 240, one base plate aperture connector 242 associated with each carrier casting rail 234. Each base plate aperture connector 242 can have an aperture that the associated carrier casting rail 234 extends through such that the base plate aperture connector 242 can slide along the associated carrier casting rail 234 between its carrier casting rail end posts 236. This enables the seat top base plate 240 to move in the second horizontal direction (parallel to the second axis 500) relative to the carrier casting 230. One or more base plate bumpers 238A, 238B can be attached to one or more of the carrier casting rails 234 to dampen horizontal movement of the base plate aperture connectors 242 along the associated carrier casting rails 234, and thus dampen horizontal movement of the seat top base plate 240 in the second horizontal direction relative to the carrier casting 230.

Base plate bumpers 238A, 238B can be attached to two carrier casting rails 234 to act as counteracting springs to dampen horizontal movement of the base plate aperture connectors 242 as shown in FIG. 5. The first base plate bumper 238A resists movement of the seat top base plate 240 in the direction of arrow C, and the second base plate bumper 238B resists movement of the seat top base plate 240 in the direction of arrow D, where arrows C and D are parallel to the second axis 500 but in opposite directions to each other. Thus, in this embodiment the base plate bumpers 238A, 238B act as counteracting springs to dampen horizontal movement of the seat top base plate 240 in the second horizontal direction relative to the carrier casting 230.

The reservoir casting 220, the reservoir casting rail end posts 224, the carrier casting 230, the carrier aperture connectors 232, the carrier casting rail end posts 236, the seat top base plate 240, and the base plate aperture connectors 242 can be made of steel or other strong, rigid material. The reservoir casting rails 222 and the carrier casting rails 234 can be steel shafts with a generally circular cross section. The carrier aperture connectors 232 and the base plate aperture connectors 242 can have Teflon coatings to reduce friction when sliding over the reservoir casting rails 222 and the carrier casting rails 234. The carrier casting bumpers 226 and the base plate bumpers 238 can be made of rubber, foam, polymer or other compressible materials to allow but dampen movement of the aperture connectors 232, 242 along the associated casting rails 222, 234. The carrier casting bumpers 226 and the base plate bumpers 238 act as springs resisting motion of the carrier aperture connectors 232 and the base plate aperture connectors 242, respectively, and can have exponentially increasing spring rate as end of travel is approached.

The reservoir casting 220 can also include an end stop bumper 228 that is surrounded by a base plate enclosure 248 formed in the seat top base plate 240 of the seat base assembly 210. In this embodiment, the seat base assembly 210 allows limited horizontal movement of the seat top base plate 240 relative to the reservoir casting 220 in the first and second horizontal directions. If the seat top base plate 240 moves far enough relative to the reservoir casting 220 that the end stop bumper 228 contacts an edge of the base plate enclosure 248, the end stop bumper 228 and base plate enclosure 248 prevent further movement of the seat top base plate 240 relative to the reservoir casting 220 in that horizontal direction. The end stop bumper 228 and/or the base plate enclosure 248 can have a rubber, foam or other compressible perimeter material to soften contact between the end stop bumper 228 and the base plate enclosure 248.

In some situations, a vehicle operator may wish to attenuate or eliminate horizontal movement of the seat 110 relative to the floor plate 202. For example, the vehicle operator may wish to attenuate or eliminate horizontal movement of the seat 110 when traveling on the side of a hill, when traveling back and forth across a gully, or in some other operator selected situation. The lateral attenuation system 250 enables an operator to dampen or eliminate movement of the seat base plate 240 relative to the reservoir casting 220 which, in this embodiment also dampens or eliminates movement of the carrier casting 230 relative to both the seat base plate 240 and the reservoir casting 220. This dampening of movement of the seat base plate 240 relative to the reservoir casting 220 effectively dampens horizontal movement of the seat 110.

Figure 6:
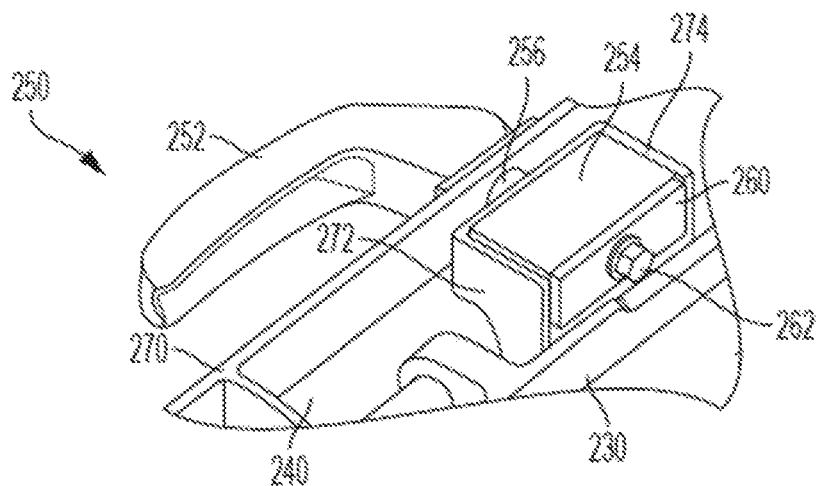
FIG. 6 illustrates the exemplary embodiment of a lateral attenuation system with a bottom-up view showing the lateral attenuation system attached to the seat top base plate with the reservoir casting removed.
Figure 7:
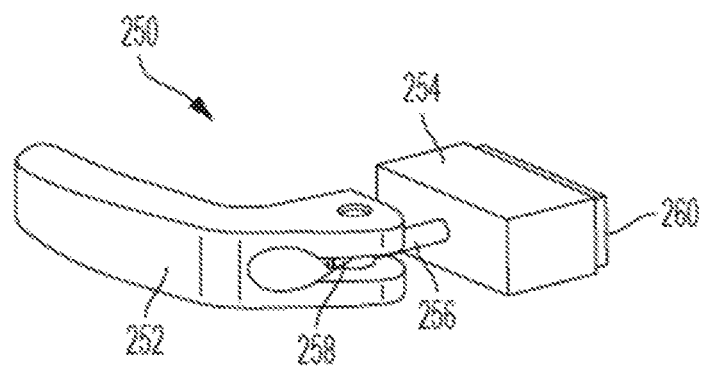
FIG. 7 the lateral attenuation system not attached to the seat base assembly.
Figure 8:
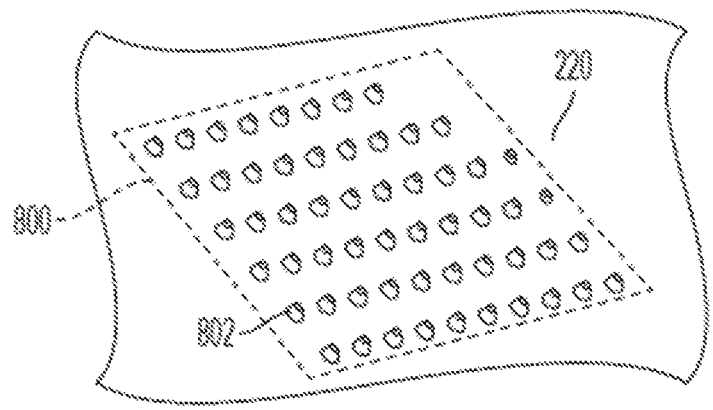
FIG. 8 illustrates an exemplary roughened area on the reservoir casting where the roughness is provided by raised bumps.

FIGS. 4 and 6-12 illustrate an exemplary embodiment of a lateral attenuation system 250 that includes an actuation mechanism 252, a stopper 254, an end plate 260 and an attenuation connector 256. FIG. 6 illustrates the exemplary embodiment of a lateral attenuation system 250 with a bottom-up view showing the lateral attenuation system 250 attached to the seat top base plate 240 with the reservoir casting 220 removed to more clearly show the coupling. FIG. 7 illustrates the lateral attenuation system 250 not attached to the seat base assembly 210.

The lateral attenuation system 250 includes an actuation mechanism 252, a stopper 254, an end plate 260 and an attenuation connector 256. In this embodiment the actuation mechanism 252 is a cam lever that pivots at a pivot connection 258 with the attenuation connector 256 which is a bolt. The attenuation connector 256 has a proximal end connected to the actuation mechanism 252 at the pivot connection 258, and a distal end connected to the end plate 260. Between the proximal and distal ends the attenuation connector 256 passes through a side wall 270 of the seat base plate 240, the stopper 254 and the end plate 260. The seat base plate 240 can also include a first stopper side wall 272 and a second stopper side wall 274 to enclose opposite lateral sides of the stopper 254. In this embodiment four sides of the stopper 254 are enclosed by the seat base plate 240: the side wall 270 of the seat base plate 240 (through which the bolt 256 passes), a top surface of the seat base plate 240 (opposite the reservoir casting 220), and the first and second stopper side walls 272, 274. And a fifth side of the stopper 254 is enclosed by the end plate 260. Thus, when compressed the stopper is constrained to bulge primarily out its sixth side towards the reservoir casting 220. The reservoir casting 220 can also include a roughened area 802 (see FIG. 8) which is located adjacent to the stopper 254. The roughened area 800 can have a plurality of raised bumps 802 or other surface roughening features. When the attenuation system 250 is activated, the stopper 254 contacts the roughened area 802 to resist movement of the seat base plate 240 relative to the reservoir casting 220.

Figure 9:
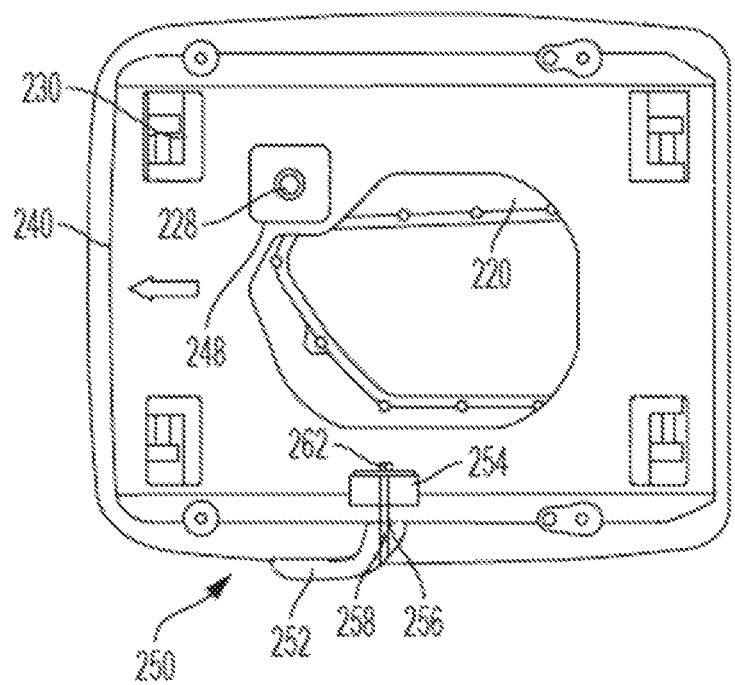
FIG. 9 illustrates the lateral attenuation system when it is not activated, with a top down view of the seat base assembly with the lateral attenuation system highlighted to show it through the seat top base plate.
Figure 10:
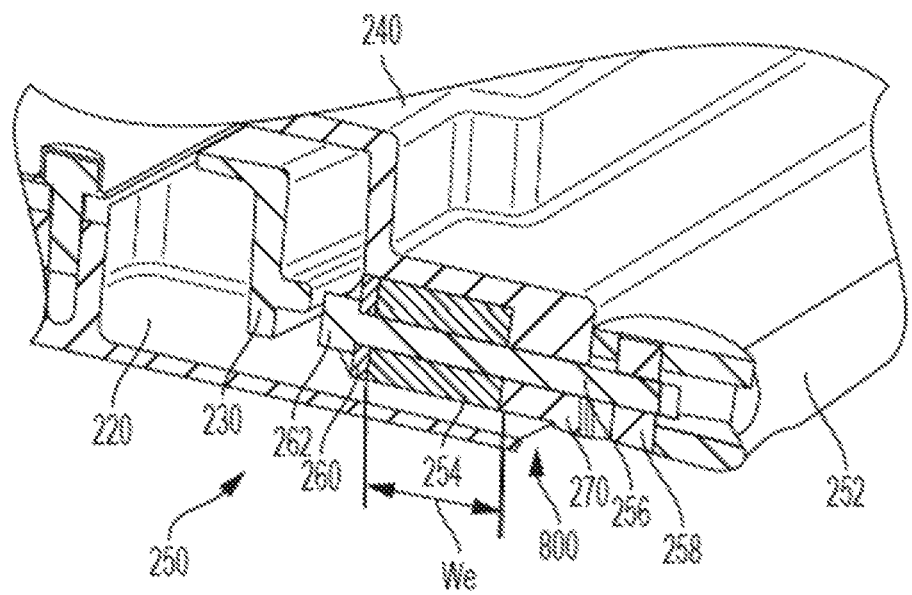
FIG. 10 illustrates the lateral attenuation system when it is not activated, with a cross-section view through the lateral attenuation system and the seat base assembly.

FIGS. 9 and 10 illustrate the lateral attenuation system 250 when it is not activated. FIG. 9 illustrates a top down view of the seat base assembly 210 with the lateral attenuation system 250 highlighted to show it through the seat top base plate 240. FIG. 10 illustrates a cross-section view through the lateral attenuation system 250 and the seat base assembly 210. The actuation mechanism 252 is in the inactivated position. In this position, the attenuation connector 256 holds the stopper 254 between the end plate 260, the side wall 270, the top surface, and the first and second stopper side walls 272, 274 of the seat top base plate 240, but does not compress the stopper 254 to cause it to contact the roughened area 802 of the reservoir casting 220. The stopper 254 has an expanded width, We. The seat top base plate 240 can move horizontally or laterally relative to the reservoir casting 220 when the lateral attenuation system 250 is not activated.

Figure 11:
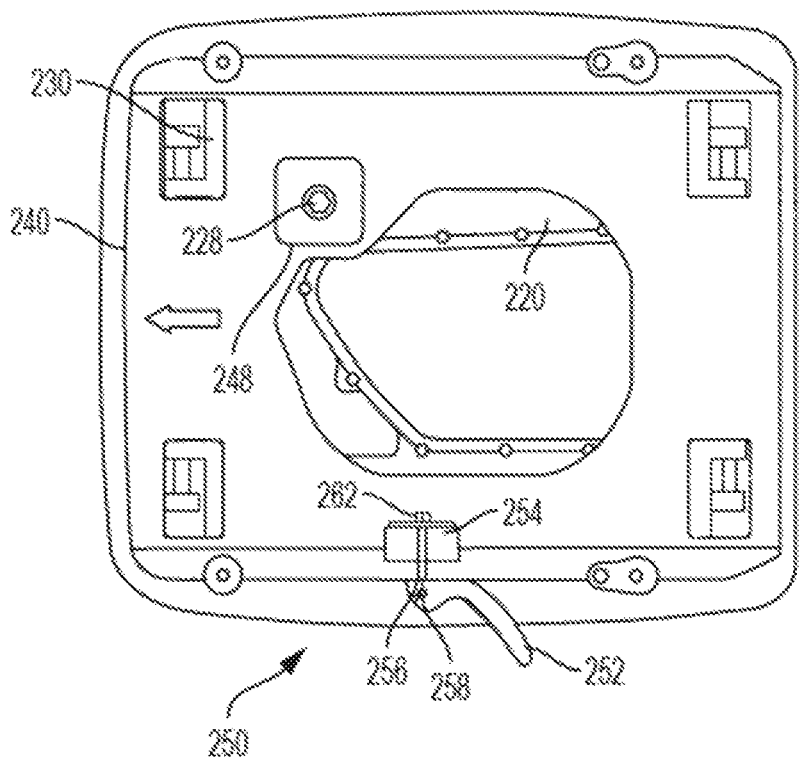
FIG. 11 illustrates the lateral attenuation system when it is activated, with a top down view of the seat base assembly with the lateral attenuation system highlighted to show it through the seat top base plate.
Figure 12:
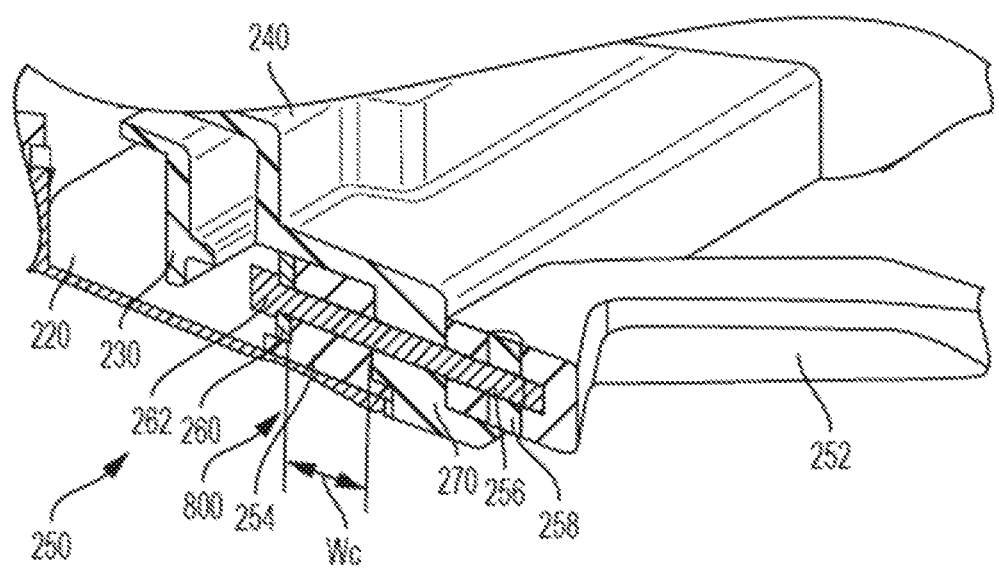
FIG. 12 illustrates the lateral attenuation system when it is activated, with a cross-section view through the lateral attenuation system and the seat base assembly.

FIGS. 11 and 12 show the lateral attenuation system 250 when it is activated. FIG. 11 illustrates a top down view of the seat base assembly 210 with the lateral attenuation system 250 highlighted to show it through the seat top base plate 240. FIG. 12 illustrates a cross-section view through the lateral attenuation system 250 and the seat base assembly 210. The actuation mechanism 252 is pivoted at the pivot connection 258 into the activated position which pulls the proximal end of the attenuation connector 256 away from the side wall 270 of the seat base plate 240. In this position, the distal end 262 of the attenuation connector 256 compresses the stopper 254 between the end plate 260 and the side wall 270 of the seat top base plate 240, which forces the stopper 254 to bulge sideways where it is constrained by the top surface and first and second stopper side walls 272, 274 of the seat top base plate 240 which leaves only the unenclosed side towards the reservoir casting 220 where the stopper 254 bulges to contact the roughened area 802 of the reservoir casting 220. The stopper 254 has a compressed width, Wc, which is less than the expanded width, We. With the stopper 254 pressing against the roughened area 802 of the reservoir casting 220, horizontal or lateral movement of the seat top base plate 240 relative to the reservoir casting 220 is attenuated or stopped.

The lateral attenuation system 250 enables the seat top 110 to be fixed in any position within its range of motion as permitted by the end stop bumper 228 and the rails 222, 234. The operator can move the seat top 110 to a desired position and activate the lateral attenuation system 250 to prevent horizontal movement of the seat top 110 from the desired position. There is no central or predetermined position that the operator must position the seat in before the lateral attenuation system 250 can be activated.

The stopper 254 can be made of rubber, foam, polymer or other compressible materials that bulges sufficiently when compressed to dampen or prevent movement of the seat base plate 240 relative to the reservoir casting 220. The end plate 260 and seat base plate 240 (including its side wall 270, top surface, and first and second stopper side walls 272, 274) can be made of steel or other rigid material that can compress the stopper 254 without significant deformation to cause the stopper 254 when compressed to bulge sufficiently toward the reservoir casting 220 to dampen or prevent movement of the seat top base plate 240 relative to the reservoir casting 220.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A seat suspension system, for a seat on a vehicle, the seat suspension system comprising:
   a seat base assembly configured to enable movement of the seat horizontally back and forth along a first horizontal axis, and to enable movement of the seat horizontally back and forth along a second horizontal axis, where the first horizontal axis is orthogonal to the second horizontal axis; and
   a lateral attenuation system that when activated is configured to dampen movement of the seat horizontally back and forth along both the first and second horizontal axes, and when inactivated is configured to not dampen movement of the seat horizontally;

wherein the seat base assembly comprises:
  a reservoir casting;
  a carrier casting coupled to the reservoir casting to enable movement of the carrier casting relative to the reservoir casting along the first horizontal axis; and
  a seat top base plate coupled to the carrier casting to enable movement of the seat top base plate relative to the carrier casting along the second horizontal axis.

2. The seat suspension system of claim 1, further comprising:
  a vertical spring system configured to enable movement of the seat in a vertical direction, where the vertical direction is orthogonal to both the first and second horizontal axes; and
  wherein the lateral attenuation system does not dampen movement of the seat in the vertical direction.

3. The seat suspension system of claim 1, wherein:
  the reservoir casting comprises a plurality of reservoir casting rails; and
  the carrier casting comprises a plurality of carrier casting connectors, each of the plurality of carrier casting connectors coupled to and associated with an associated reservoir casting rail of the plurality of reservoir casting rails;
  wherein each of the plurality of carrier casting connectors is configured to move back and forth along its associated reservoir casting rail in parallel to the first horizontal axis.

4. The seat suspension system of claim 3, wherein:
  the reservoir casting comprises a first carrier casting bumper attached to a first reservoir casting rail of the plurality of reservoir casting rails, and a second carrier casting bumper attached to a second reservoir casting rail of the plurality of reservoir casting rails;
  wherein the first and second carrier casting bumpers dampen movement of the plurality of carrier casting connectors back and forth along their associated reservoir casting rails.

5. The seat suspension system of claim 4, wherein:
  the first reservoir casting bumper dampens movement of the plurality of carrier casting connectors back and forth along their associated reservoir casting rails in a first direction parallel to the first horizontal axis; and
  the second reservoir casting bumper dampens movement of the plurality of carrier casting connectors back and forth along their associated reservoir casting rails in a second direction parallel to the first horizontal axis; and
  wherein the second direction is opposite of the first direction.

6. The seat suspension system of claim 3, wherein:
  the carrier casting comprises a plurality of carrier casting rails; and
  the seat top base plate comprises a plurality of base plate connectors, each of the plurality of base plate connectors coupled to and associated with an associated carrier casting rail of the plurality of carrier casting rails;
  wherein each of the plurality of base plate connectors is configured to move back and forth along its associated carrier casting rail in parallel to the second horizontal axis.

7. The seat suspension system of claim 6, wherein:
  the carrier casting comprises a first base plate bumper attached to a first carrier casting rail of the plurality of carrier casting rails, and a second base plate bumper attached to a second carrier casting rail of the plurality of carrier casting rails;
  wherein the first and second base plate bumpers dampen movement of the plurality of base plate connectors back and forth along their associated carrier casting rails.

8. The seat suspension system of claim 7, wherein:
  the first base plate bumper dampens movement of the plurality of base plate connectors back and forth along their associated carrier casting rails in a third direction parallel to the second horizontal axis; and
  the second base plate bumper dampens movement of the plurality of base plate connectors back and forth along their associated carrier casting rails in a fourth direction parallel to the second horizontal axis; and
  wherein the fourth direction is opposite of the third direction.

9. The seat suspension system of claim 6, wherein the seat base assembly further comprises an end stop bumper that limits movement of the carrier casting relative to the reservoir casting along the first horizontal axis and limits movement of the seat top base plate relative to the carrier casting along the second horizontal axis.

10. The seat suspension system of claim 1, wherein the lateral attenuation system comprises:
  an actuation mechanism;
  a stopper; and
  an attenuation connector that couples the actuation mechanism and the stopper to the seat base assembly;
  wherein the actuation mechanism is configured to move between an activated position where the lateral attenuation system dampens movement of the seat back and forth along both the first and second horizontal axes, and an inactivated position where the lateral attenuation system does not dampen movement of the seat back and forth along either of the first or second horizontal axes.

11. The seat suspension system of claim 10, wherein when the actuation mechanism is in the activated position, the stopper connects the reservoir casting with the seat top base plate.

12. The seat suspension system of claim 11, wherein the reservoir casting includes a roughened area, and when the actuation mechanism is in the activated position, the stopper contacts the roughened area of the reservoir casting.

13. The seat suspension system of claim 11, wherein the seat top base plate includes a base plate side wall, the actuation mechanism is on one side of the base plate side wall, the stopper is on the opposite side of the base plate side wall, and the attenuation connector passes through the base plate side wall to couple the actuation mechanism and the stopper.

14. The seat suspension system of claim 13, wherein the lateral attenuation system further comprises an end plate coupled to the stopper by the attenuation connector such that the stopper is positioned on the attenuation connector between the base plate side wall and the end plate;
  wherein when the actuation mechanism is in the activated position, the end plate is pulled towards the base plate side wall to compress the stopper and force the stopper to bulge and connect the reservoir casting with the seat top base plate.

15. The seat suspension system of claim 14, wherein the seat top base plate further comprises first and second stopper side walls, wherein the first and second stopper side walls are generally perpendicular to the base plate side wall, and the first and second stopper side walls being on opposite sides of the stopper;
wherein when the actuation mechanism is in the activated position, the end plate is pulled towards the base plate side wall to compress the stopper between the end plate, the base plate side wall and first and second stopper side walls to force the stopper to bulge and connect the reservoir casting with the seat top base plate.

16. The seat suspension system of claim 11, wherein:
the reservoir casting comprises a plurality of reservoir casting rails; and
the carrier casting comprises a plurality of carrier casting connectors and a plurality of carrier casting rails, each of the plurality of carrier casting connectors coupled to and associated with an associated reservoir casting rail of the plurality of reservoir casting rails; and
the seat top base plate comprises a plurality of base plate connectors, each of the plurality of base plate connectors coupled to and associated with an associated carrier casting rail of the plurality of carrier casting rails;
wherein each of the plurality of carrier casting connectors is configured to move back and forth along its associated reservoir casting rail in parallel to the first horizontal axis, and each of the plurality of base plate connectors is configured to move back and forth along its associated carrier casting rail in parallel to the second horizontal axis.

17. The seat suspension system of claim 16, wherein:
the reservoir casting comprises a first carrier casting bumper attached to a first reservoir casting rail of the plurality of reservoir casting rails, and a second carrier casting bumper attached to a second reservoir casting rail of the plurality of reservoir casting rails; and the first and second carrier casting bumpers dampen movement of the plurality of carrier casting connectors back and forth along their associated reservoir casting rails
the carrier casting comprises a first base plate bumper attached to a first carrier casting rail of the plurality of carrier casting rails, and a second base plate bumper attached to a second carrier casting rail of the plurality of carrier casting rails; and the first and second base plate bumpers dampen movement of the plurality of base plate connectors back and forth along their associated carrier casting rails.

18. The seat suspension system of claim 16, wherein the seat base assembly further comprises an end stop bumper that limits movement of the carrier casting relative to the reservoir casting within a first movement range along the first horizontal axis and limits movement of the seat top base plate relative to the carrier casting within a second movement range along the second horizontal axis; and
the lateral attenuation system is configured to stop movement of the seat back and forth along both the first and second horizontal axes at any desired position within the first and second ranges.

* * * * *